US006949923B2

(12) United States Patent
Schultz et al.

(10) Patent No.: US 6,949,923 B2
(45) Date of Patent: Sep. 27, 2005

(54) METHOD AND CIRCUIT FOR DETECTING THE ARMATURE POSITION OF AN ELECTROMAGNET

(75) Inventors: Wolfgang Ernst Schultz, Memmingen (DE); Dieter Kleinert, Memmingen (DE); Peter Tappe, Memmingen (DE); Jürgen Heinzmann, Babenhausen (DE); Horst-Peter Wassermann, Memmingen (DE)

(73) Assignee: Wolfgang E. Schultz, Memmingen (DE)

( * ) Notice: Subject to any disclaimer, the term of this patent is extended or adjusted under 35 U.S.C. 154(b) by 0 days.

(21) Appl. No.: 10/269,995

(22) Filed: Oct. 15, 2002

(65) Prior Publication Data

US 2003/0071613 A1 Apr. 17, 2003

(30) Foreign Application Priority Data

Oct. 12, 2001 (DE) ........................................ 101 50 199

(51) Int. Cl.[7] .................................................. G01B 7/14
(52) U.S. Cl. .............................. 324/207.18; 324/207.24
(58) Field of Search ....................... 324/207.16, 207.18, 324/207.24, 654–657; 123/90.11; 335/220; 361/86, 87; 137/554

(56) References Cited

U.S. PATENT DOCUMENTS

| | | | | |
|---|---|---|---|---|
| 3,789,876 A | * | 2/1974 | Kempton et al. | 137/554 |
| 4,205,307 A | | 5/1980 | Liermann et al. | 340/644 |
| 5,204,633 A | * | 4/1993 | Ahladas et al. | 324/654 |
| 5,804,962 A | * | 9/1998 | Kather et al. | 324/207.16 |
| 5,942,892 A | * | 8/1999 | Li | 324/207.16 |
| 6,034,856 A | * | 3/2000 | Kather et al. | 361/87 |
| 6,359,435 B1 | * | 3/2002 | Czimmek et al. | 324/234 |
| 6,469,500 B1 | * | 10/2002 | Schmitz et al. | 324/207.16 |
| 6,518,748 B2 | * | 2/2003 | Butzmann et al. | 324/207.16 |

FOREIGN PATENT DOCUMENTS

| | | | | |
|---|---|---|---|---|
| DE | 3423505 A1 | * | 11/1985 | H01F/7/18 |
| DE | 8714942 | | 1/1988 | |
| DE | 19733138 A1 | | 2/1999 | |
| EP | 0499419 A2 | | 8/1992 | |
| JP | 06038582 A | * | 2/1994 | H02P/6/02 |
| JP | 2001330405 A | * | 11/2001 | G01B/7/00 |

* cited by examiner

*Primary Examiner*—Bot Ledynh
*Assistant Examiner*—Reena Aurora
(74) *Attorney, Agent, or Firm*—Jacobson Holman PLLC

(57) ABSTRACT

The invention relates to a method and to a circuit for detecting the armature position of an electromagnet. The magnetic voltage is compared with a reference voltage. The reference voltage is used derived from the magnetic voltage by a filtration.

12 Claims, 2 Drawing Sheets

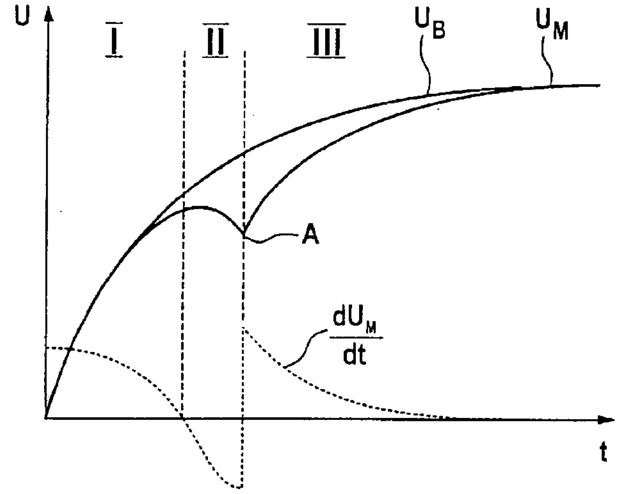
( Prior Art ) Fig. 2
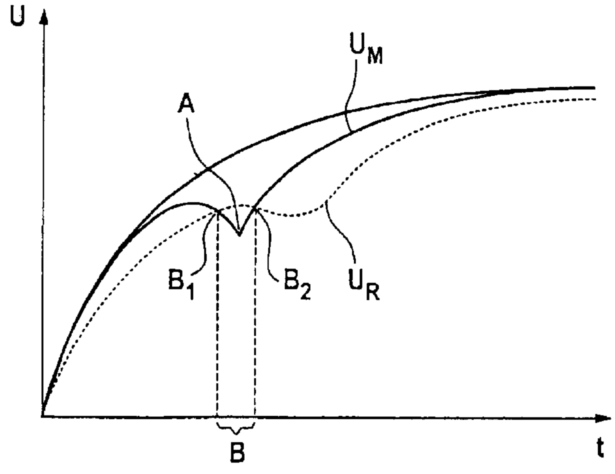
Fig. 3

METHOD AND CIRCUIT FOR DETECTING THE ARMATURE POSITION OF AN ELECTROMAGNET

The invention relates to a method for detecting the armature position of an electromagnet, a magnetic voltage being generated by the magnetic current flowing through the coil and this magnetic voltage being compared with a reference voltage and a corresponding armature position being established as a result of this comparison. The invention also relates to a circuit for detecting the armature position of an electromagnet, the magnetic current flowing through the coil leading at a resistor to a magnetic voltage and the latter being compared in a comparator with a reference voltage, wherein a corresponding output signal can be picked up at the output of the comparator if the appropriate comparison condition of magnetic voltage and reference voltage exists in the comparator.

BACKGROUND OF THE INVENTION

Electromagnets are used in many sectors in engineering. They are known, for example, as final control elements for hydraulic valves etc. There are a large number of applications in which it is important to ensure that the armature has attracted, i.e. that the armature has arrived in its end position. This results in a characteristic course in the current/time graph, as is indicated, for example, in FIG. 2 (the magnetic voltage can serve in place of the current).

German Patent Application 197 33 138 in particular is known in this regard in the prior art. As claimed in the solution proposed here the magnetic current is converted into a current-proportional voltage and the converted voltage differentiated. This differentiated magnetic voltage is compared with a threshold value. This threshold value is averaged from the differentiated magnetic voltage.

The drawback of the method known in the prior art is the relatively high number of subassemblies. The magnetic voltage must initially be differentiated, a reference voltage only then being obtained by averaging from the differentiated magnetic voltage. In addition to the increased failure probability owing to the greater number of components, there is also the risk in this method of a falsification of the result as the measured voltage is multiply changed by the subassemblies.

SUMMARY OF THE INVENTION

The object of the invention is therefore to provide a method and a circuit for detecting the armature position of an electromagnet which functions reliably on the one hand and, on the other hand, is not so expensive as the prior art solutions.

This object is achieved in that in the method as claimed in the invention a filtered, optionally flattened magnetic voltage is used as a reference voltage.

The characteristic current or voltage course over the time for the movement of an armature of an electromagnet is divided into three portions. The current flowing through the coil breaks in if the armature has reached the end position, i.e. "switches". If the armature reaches its end position, the current increases again to achieve the holding current. As it is easier electronically to compare voltages with one another than currents, reference will generally be made hereinafter to magnetic voltage or reference voltage without, wishing to limit the invention thereto. The insertion of a resistor allows simple conversion of a variable current into a variable voltage, in accordance with Ohm's law, As the magnetic voltage exceeds a maximum over time before achieving the armature end position, a point of intersection can be generated, with appropriate choice of flattening of the reference voltage, which is used as a signal for the armature reaching the end position.

In contrast to the solution of the prior art, as claimed in the proposal of the invention the untreated or only slightly treated magnetic voltage is compared with a filtered or flattened magnetic voltage as a reference voltage. As the circuit designed in this way is not so complex it is also considerably less susceptible to faults and can also be produced inexpensively. The presented concept as claimed in the invention of a dynamic limiting curve method also allows the independence of the method from temperature influences or magnet types as the reference voltage is not constant but is derived from the magnetic voltage in relation to the magnetic voltage to be monitored.

A flattened magnetic voltage is proposed as claimed in the invention as a reference voltage. The flattening can be achieved, for example, by using a low-pass filter as filter. The use of the low-pass filter cuts off the high frequency portions of the magnetic field voltage. The signal filtered in this manner reacts more inertly than the source signal (magnetic voltage). With a brief lowering of the magnetic voltage, the reference voltage intersects the magnetic voltage (over time). The undershooting of the reference voltage can be read out by the following electronic device (for example a comparator) and be used for corresponding evaluation purposes (visual signals, process monitoring etc.). In addition hereto a voltage divider can be provided to achieve a corresponding lowering of the level of the reference voltage below the magnetic voltage.

BRIEF DESCRIPTION OF THE DRAWINGS

FIG. 2 is a U-t graph of the course of the magnetic voltage under reference voltage as claimed in the prior art and FIG. 3 is a U-t graph of the magnetic voltage as claimed in the invention.

DETAILED DESCRIPTION OF THE PREFERRED EMBODIMENTS

Figure 1:
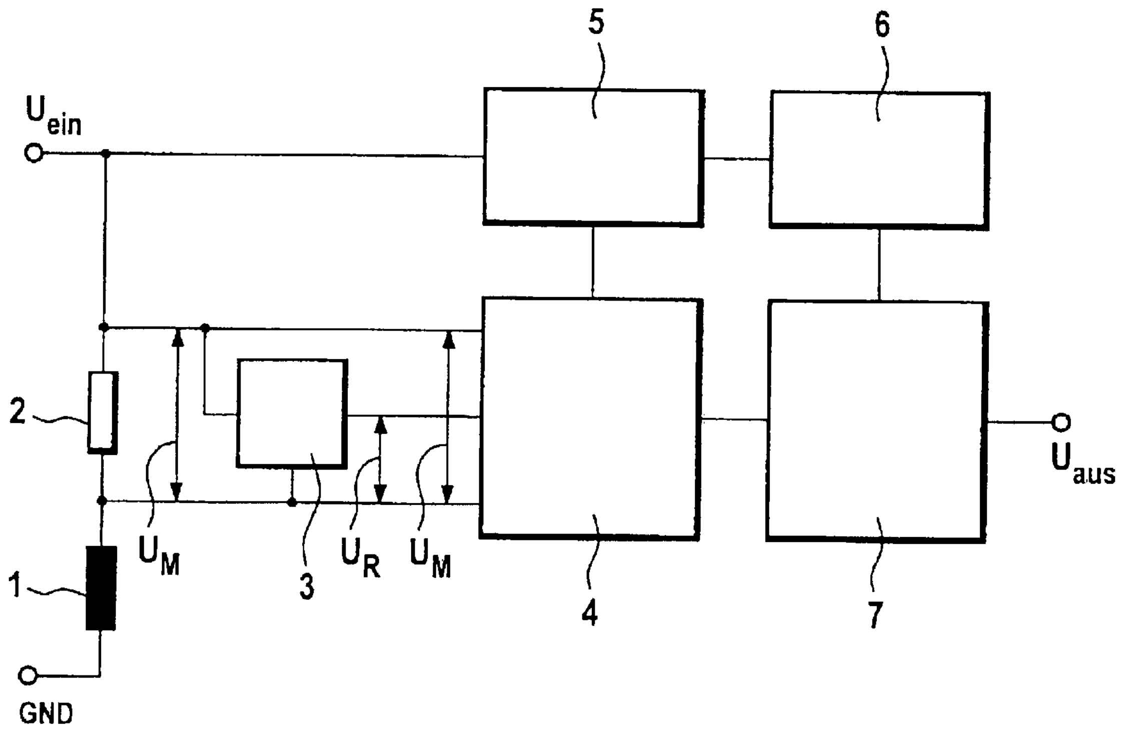
FIG. 1 shows the circuit as claimed in the invention as a block diagram.

The invention is described schematically in the circuit arrangement of FIG. 1. The input voltage $U_{in}$ is applied to the magnet 1. The current flowing through the magnet 1 leads to a voltage drop at the shunt resistor 2. This voltage drop is hereinafter designated magnetic voltage $U_M$.

A reference voltage $U_R$ is now generated as claimed in the invention from the magnetic voltage $U_M$ in that a filter 3 is provided. The filter 3 is formed as a low-pass filter and/or voltage divider here and generates the reference voltage $U_R$. The magnetic voltage $U_M$ and the reference voltage $U_R$ is applied to the comparator 4 at different inputs. The comparator 4 accordingly compares the two characteristic curves $U_M$ and $U_R$. The comparator 4 can advantageously be designed here as an operational amplifier. The two characteristic curves only intersect at the operating peak, i.e. if the armature has reached its end position, in accordance with the dimensioning of the filter.

To hold the signal over the operating period of the magnet 1 a holding member 7 and a reset 6 are provided. The comparator 4 and the reset 6 are supplied by a voltage bias 5.

The effect as claimed in the invention is clear when the graphs of FIGS. 2 and 3 are compared.

FIGS. 2 and 3 show voltage-time graphs.

FIG. 2 shows the solution as claimed in the prior art, in particular the gradient method.

In time segment I the armature is accelerated, the current increases and consequently the voltage picked up at the shunt resistor also increases. The counter-induction increases at the same time.

In time interval II, the current (and therefore also the voltage) breaks in owing to the counter-induction and the armature arrives in its end position. The switching instant, i.e. the instant in which the armature reaches its end position, is denoted by A. There is again a current (and therefore voltage) increase up to the holding current in time interval III. In contrast to this course denoted by $U_M$, the voltage course $U_B$ is indicated if the armature blocks. It is apparent that there is no voltage drop, in particular in the time interval II, in the voltage course $U_B$ and therefore there is a characteristic difference.

The derivation of the magnetic voltage is indicated by $dU_M/dt$. This derivation is negative in the time interval II. This signal is utilised in accordance with the relatively complex solution of the prior art.

FIG. 3 shows the solution as claimed in the invention. As claimed in the circuit arrangement of the invention in FIG. 1, a reference voltage $U_R$ is derived from the magnetic voltage $U_M$. The time interval B is limited by the two points of intersection $B_1$ and $B_2$ of the reference voltage $U_R$ with the magnetic voltage $U_M$. Within the time segment B the reference voltage $U_R$ is greater than the magnetic voltage $U_M$. The instant A denoting the switching state or the attainment of the end position of the armature, is located within the time interval B. A reliable method for detecting the end position of the armature is provided by the proposal as claimed in the invention which functions reliably independently of external influences.

The output signal $U_{out}$ is present at the output within the time interval B. This output signal can be displayed visually in that, for example, an LED is provided. It is also possible to pass the output signal $U_{out}$ to a monitoring controller monitoring the electromagnet and further processing the signal digitally or in an analogue manner accordingly.

The claims submitted now with the application and to be submitted later on constitute attempts at wording without prejudice to the obtaining of continuing protection. The relationships cited in the dependent claims refer to the further development of the subject of the main claim provided for by the features of the respective sub-claims. However, these relationships must not be interpreted as waiving the requirement to obtain independent, subjective protection for the features of the related sub-claims.

Features which so far have only been disclosed in the description may be claimed in the course of the proceedings as being of significance to the invention, for example for delimitation from the prior art.

What is claimed is:

1. A method for detecting the armature position of an electromagnet comprising the steps of:

generating a magnetic voltage by a magnetic current flowing through a coil;

comparing the magnetic voltage with a reference voltage; and establishing a corresponding armature position as a result of the comparison;

wherein a filtered, optionally flattened magnetic voltage is used as the reference voltage and the magnetic voltage is compared unchanged with the reference voltage.

2. The method as claimed in claim 1, wherein the reference voltage is generated from the magnetic voltage by a low-pass filter as filter.

3. The method as claimed in claim 1, wherein the reference voltage is generated from the magnetic voltage by a voltage divider.

4. The method as claimed in claim 1, wherein the point of intersection of the course of the reference voltage and of the magnetic voltage is evaluated as a switch signal or signal of the armature position.

5. The method as claimed in claim 1, wherein the reference voltage and the magnetic voltage are compared permanently.

6. The method as claimed in claim 1, wherein the magnetic voltage and the reference voltage are applied to the comparator at different inputs.

7. A circuit for detecting the armature position of an electromagnet having a magnetic current flowing through a coil leading to a magnetic voltage at a resistor by producing a potential difference at the resistor and the magnetic voltage being compared unchanged with the reference voltage, a corresponding output signal being adapted to be picked up at the output of the comparator if the appropriate comparison condition of magnetic voltage and reference voltage exists in the comparator, wherein the reference voltage ($U_R$) is generated in a filter from the magnetic voltage ($U_M$) by a flattening of the magnetic voltage ($U_M$) and the comparator is provided with different inputs for applying the magnetic voltage and the reference voltage.

8. The circuit as claimed in claim 7, wherein an operational amplifier is used as a comparator.

9. The circuit as claimed in claim 7, wherein an output signal ($U_{out}$) can be picked up at the output of the comparator if the course of reference voltage ($U_R$) and magnetic voltage ($U_M$) intersect.

10. The circuit as claimed in claim 7, wherein a holding member or flip-flop and a reset are provided for holding a switch signal as output signal of the comparator.

11. The circuit as claimed in claim 7, wherein a low-pass filter and/or voltage divider is provided as the filter.

12. The circuit as claimed in claim 7, wherein the output signal ($U_{out}$) is displayed visually and/or is fed into a monitoring controller.

* * * * *